United States Patent
Ahmed et al.

(10) Patent No.: US 12,258,513 B2
(45) Date of Patent: *Mar. 25, 2025

(54) METHOD FOR REDUCING HYDROGEN SULFIDE IN A SUBTERRANEAN FORMATION

(71) Applicant: KING FAHD UNIVERSITY OF PETROLEUM AND MINERALS, Dhahran (SA)

(72) Inventors: Ashraf Ahmed, Dhahran (SA); Salaheldin Elkatatny, Dhahran (SA); Sagheer Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,281

(22) Filed: Aug. 12, 2024

(65) Prior Publication Data

US 2024/0400883 A1    Dec. 5, 2024

Related U.S. Application Data

(62) Division of application No. 18/297,041, filed on Apr. 7, 2023, now Pat. No. 12,110,447.

(51) Int. Cl.
*E21B 21/06* (2006.01)
*C09K 8/03* (2006.01)
*E21B 41/02* (2006.01)

(52) U.S. Cl.
CPC ............ *C09K 8/032* (2013.01); *E21B 41/02* (2013.01); *C09K 2208/18* (2013.01); *C09K 2208/20* (2013.01); *E21B 21/067* (2013.01)

(58) Field of Classification Search
None
See application file for complete search history.

(56) References Cited

U.S. PATENT DOCUMENTS

| 4,008,775 A | 2/1977 | Fox |
| 4,246,243 A | 1/1981 | Fox |

(Continued)

FOREIGN PATENT DOCUMENTS

| CA | 1 179 622 | 12/1984 |

OTHER PUBLICATIONS

Ahmed et al. ; Investigation of Using Various Quantities of Steel-making Waste for Scavenging Hydrogen Sulfide in Drilling Fluids ; Hindawi Geofluids, vol. 2022 ; Aug. 28, 2022 ; 9 Pages.

(Continued)

*Primary Examiner* — Andrew Sue-Ako
(74) *Attorney, Agent, or Firm* — Oblon, McClelland, Maier & Neustadt, L.L.P.

(57) ABSTRACT

A drilling fluid composition includes a base fluid; at least one additive selected from the group consisting of an anti-foaming agent, a fluid-loss additive, a viscosity modifier, a shale stabilizer, an alkali compound, a bridging agent, and a weighting agent; and 0.01 to 0.5 weight percentage (wt. %) of particles of steel slag, based on a total weight of the drilling fluid composition. A method for reducing a hydrogen sulfide ($H_2S$) content of a $H_2S$-containing subterranean formation. A process for removing $H_2S$ from a $H_2S$-containing gas composition by the drilling fluid composition.

13 Claims, 7 Drawing Sheets

(56) References Cited

U.S. PATENT DOCUMENTS

| | | | |
|---|---|---|---|
| 4,835,043 A | 5/1989 | Fox et al. | |
| 12,110,447 B1* | 10/2024 | Ahmed | C09K 8/5045 |
| 12,152,190 B1* | 11/2024 | Ahmed | C09K 8/5045 |
| 12,173,223 B1* | 12/2024 | Ahmed | C09K 8/032 |
| 2020/0317981 A1* | 10/2020 | Mohamed | C09K 8/18 |

OTHER PUBLICATIONS

Onaizi et al. ; H2S Scavenging Capacity and Rheological Properties of Water-Based Drilling Muds ; ACS Omega 2020, 5, 47 ; Nov. 18, 2020 ; 31 Pages.

* cited by examiner

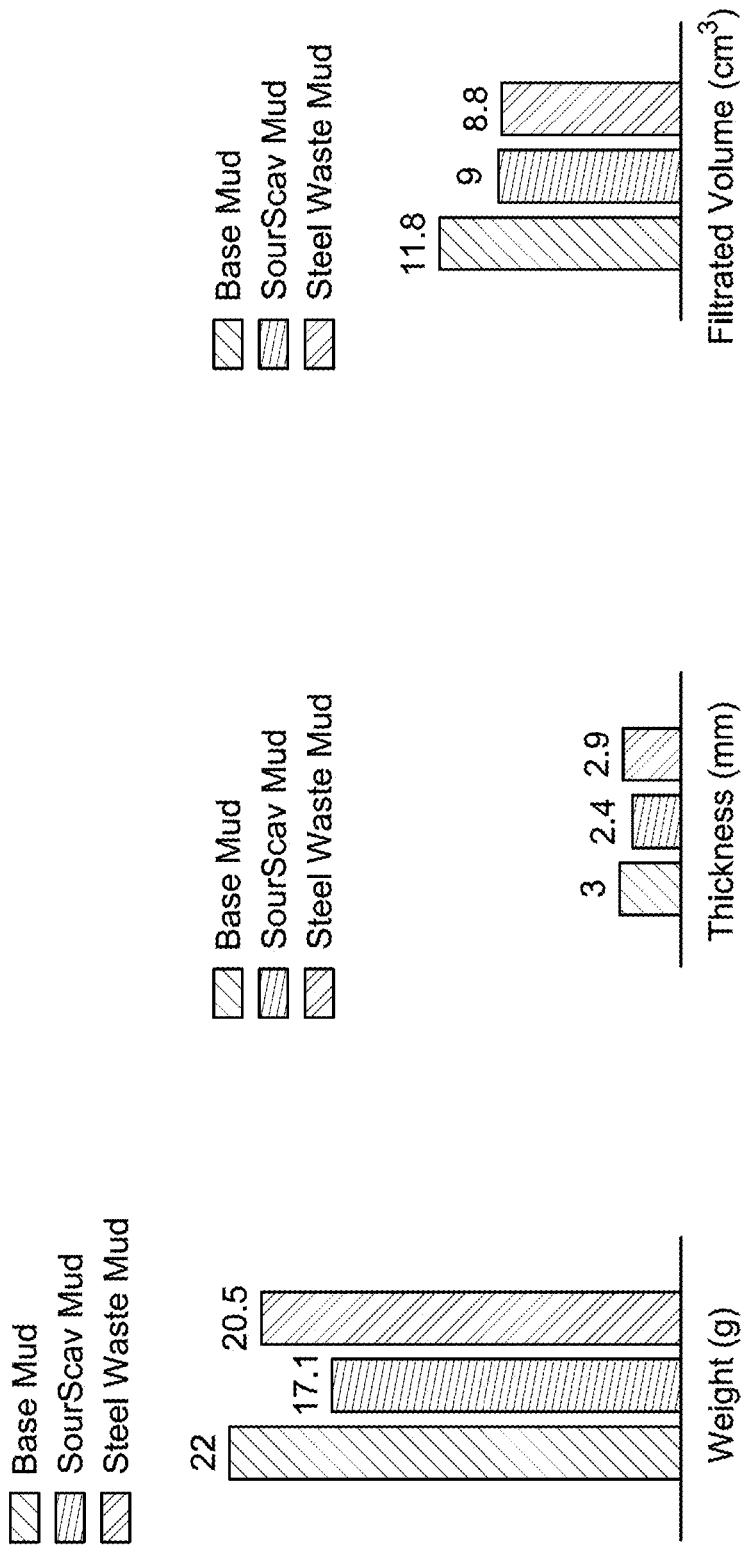

METHOD FOR REDUCING HYDROGEN SULFIDE IN A SUBTERRANEAN FORMATION

CROSS-REFERENCE TO RELATED APPLICATIONS

The present application is a Division of U.S. application Ser. No. 18/297,041, now allowed, having a filing date of Apr. 7, 2023.

STATEMENT REGARDING PRIOR DISCLOSURE BY THE INVENTORS

Aspects of this technology are described in "Incorporating steel-industry waste in water based drilling fluids for hydrogen sulfide scavenging," Journal of Petroleum Science and Engineering, Volume 216, 110818, which is incorporated herein by reference in its entirety.

BACKGROUND

Technical Field

The present disclosure is directed to drilling fluids, and particularly to a drilling fluid composition including steel slag and method for removing hydrogen sulfide content using the drilling fluid composition.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Drilling fluids, also known as drilling muds, require optimal design to ensure successful wellbore drilling. This is achieved by selecting appropriate additives to fulfill the necessary functions of the drilling mud. Among the applied types of drilling fluids (i.e., aqueous and non-aqueous based mud), a water-based mud (WBM) is widely used in drilling operations due to its favorable techno-economic performance [See: Ahmed, A., Alsaihati, A., Elkatatny, S., 2020. An Overview of the Common Water-Based Formulations Used for Drilling Onshore Gas Wells in the Middle East. Arab. J. Sci. Eng; Caenn, R., Darley, H., Gray, G. R., 2016. Composition and Properties of Drilling and Completion Fluids, 7th ed. Elsevier; and Gray, G. R., Young, F. S., 1973. 25 Years of Drilling Technology—A Review of Significant Accomplishments. J. Pet. Technol. 25, 1347-1354]. Nevertheless, the WBM poses various challenges related to wellbore stability, formation damage, and fluid stability at elevated temperatures and unconventional formations, necessitating the optimization of the WBM performance to achieve the non-aqueous based mud's technical advantages [See: Jiang, G., Sun, J., He, Y., Cui, K., Dong, T., Yang, L., Yang, X., Wang, X., 2021. Novel water-based drilling and completion fluid technology to improve wellbore quality during drilling and protect unconventional reservoirs. Engineering; and Luo, J., Jiang, G., Wang, G., Dong, T., He, Y., Li, B., 2019. Development of an environmentally friendly strongly inhibitive chloride free water base drilling fluid. Drill. Fluid Complet. Fluid 36, 594-599].

One common problem in drilling subterranean formations is the occurrence of hydrogen sulfide ($H_2S$) gas. $H_2S$ gas is highly corrosive, poisonous, colorless, flammable, reactive gas that is heavier than air, with a specific gravity of 1.2 [See: Chou, C.-H. S. J., Chi-H. S. J., Ogden, J. M., Pohl, H. R., Scinicariello, F., Ingerman, L., Barber, L., Citra, M. J., 2016. Toxicological Profile for Hydrogen Sulfide and Carbonyl Sulfide]. In drilling operations, $H_2S$ gas may invade the drilling fluid system from either the metabolism of sulfate-reducing bacteria (SRB) that grows in anaerobic oilfield conditions, the thermal decomposition of drilling fluid additives, or by invading $H_2S$ gas pockets or formations containing underground water and oil that is contaminated with the $H_2S$ gas [See: Jiashen, Z., Jingmao, Z., 1993. Control of Corrosion by Inhibitors in Drilling Muds Containing High Concentration of $H_2S$. CORROSION 49, 170-174; MI-Swaco, 2001. Corrosion, in: Engineering Drilling Fluid Manual; Sandnes, E. S., Hundvag, H. O., 2002. Removal of $H_2S$ in Drilling Mud. 6365053B1 and Sayyadnejad, M. A., Ghaffarian, H. R., Saeidi, M., 2008. Removal of Hydrogen Sulfide by Zinc Oxide Nanoparticles in Drilling Fluid. Int. J. Environ. Sci. Technol. 5, 565-569].

The release of $H_2S$ gas during drilling results in equipment corrosion due to either the increase in the contained fluids acidity or the formation of the corrosive iron sulfide [See: Amosa, M., Mohammed, I., Yaro, S., 2010. Sulphide Scavengers in Oil and Gas Industry—A Review. NAFTA 61, 85-92; Brondel, D., Edwards, R., Hayman, A., Hill, D., Mehta, S., Semerad, T., 1994. Corrosion in the Oil Industry. Oilf. Rev. 6, 4-18; Browning, W. C., Young, H. F., 1975. Process for Scavenging Hydrogen Sulfide in Aqueous Drilling Fluids and Method of Preventing Metallic Corrosion of Subterranean Well Drilling Apparatuses. 3928211; Grondin, G. Y., Kulak, G. L., 1994. Fatigue Testing of Drillpipe. SPE Drill. Complet. 9, 95-102; Kembaiyan, K. T., Keshavan, K., 1995. Combating Severe Fluid Erosion and Corrosion of Drill Bits Using Thermal Spray Coatings. Wear 186-187, P, 487-492; Stevens, R., Ke, M., Javora, P. H., Qi, Q., 2004. Oilfield Environment-Induced Stress Corrosion Cracking of CRAs in Completion Brines, in: SPE Annual Technical Conference and Exhibition, Houston, Texas, September 26-29. SPE; Tung, N. P., Hung, P. V., Tien, H. D., Loi, C. M., 2001. Study of Corrosion Control Effect of $H_2S$ Scavengers in Multiphase Systems, in: SPE International Symposium on Oilfield Chemistry, Houston, Texas, February 13-16. SPE; and Wylde, J., 2016. Composition and Method for Scavenging Sulfides and Mercaptans. WO2016180563A1]. The corrosive iron sulfide formed tends to adhere strongly to steel surfaces, forming a scale. This can lead to pitting corrosion, shorten the equipment's lifespan, and even cause formation plugging [See: Menendez, C. M., Jovancicevic, V., Ramachandran, S., Morton, M., Stegmann, D., 2013. Assessment of Corrosion Under Iron Sulfide Deposits and CO2/H2S Conditions. CORROSION 69, 145-156; and Nalli, K., 2010. Corrosion and its Mitigation in theOil & Gas Industry—An overview]. The $H_2S$ gas may also react with steel as a catalyst or accelerator to produce hydrogen ion which results in metal brittle failure through either hydrogen embrittlement or stress cracking [See: Chen, C., Huang, W., 1986. A Study Of Sulfide Scavenger, in: Nternational Meeting on Petroleum Engineering, Beijing, China, March 17-20. Society of Petroleum Engineers; Kane, R. D., Greer, J. B., 1977. Sulfide Stress Cracking of High-Strength Steels In Laboratory and Oilfield Environments. J. Pet. Technol. 29, 1483-1488; MI-Swaco, 2001. Corrosion, in: Engineering Drilling Fluid Manual and Tung, N. P., Hung, P. V., Tien, H. D., Loi, C. M., 2001. Study of Corrosion Control Effect of H₂S Scavengers in Multiphase Systems, in: SPE International Symposium on Oilfield Chemistry, Houston, Texas, February 13-16. SPEJ]. The transfer of H₂S gas from the formation fluids to the drilling fluid can cause a variety of issues, including changes in mud viscosity, fluid loss, and density, leading to potential well kick problems. Additionally, the presence of H₂S gas can reduce the pH of the drilling mud, which increases its corrosiveness towards metallic structures [See: Amosa, M., Mohammed, I., Yaro, S., 2010. Sulphide Scavengers in Oil and Gas Industry-A Review. NAFTA 61, 85-92; Browning, W. C., Young, H. F., 1975. Process for Scavenging Hydrogen Sulfide in Aqueous Drilling Fluids and Method of Preventing Metallic Corrosion of Subterranean Well Drilling Apparatuses. 3928211; Popoola, L., Grema, A., Latinwo, G., Gutti, B., Balogun, A., 2013. Corrosion Problems During Oil and Gas Production and Its Mitigation. Int. J. Ind. Chem. 4, 35; and Ray, J. D., Randall, B. V., Parker, J. C., 1979. Use of Reactive Iron Oxide To Remove H₂S From Drilling Fluid. J. Pet. Technol. 31, 797-801]. Moreover, the escape of this lethal gas to surface makes an extreme hazard to the health of personnel with various impacts depending on the duration and level of exposure [See: Almeida, A., 1999. Differential Sensitivity of Lung and Brain to Sulfide Exposure: A Peripheral Mechanism for Apnea. Toxicol. Sci. 50, 287-293; Arnold, I. M. F., Dufresne, R. M., Alleyne, B. C., Stuart, P. J. W., 1985. Health Implication of Occupational Exposures to Hydrogen Sulfide. J. Occup. Environ. Med. 27, 373-376; Chou, C.-H. S. J., Chi-H. S. J., Ogden, J. M., Pohl, H. R., Scinicariello, F., Ingerman, L., Barber, L., Citra, M. J., 2016. Toxicological Profile for Hydrogen Sulfide and Carbonyl Sulfide; Masi, A. di, Ascenzi, P., 2013. H₂S: A "Double Face" Molecule in Health and Disease. BioFactors 39, 186-196; and MI-Swaco, 2001. Corrosion, in: Engineering Drilling Fluid Manual].

Because of the harmful effects and damage it can cause, the removal and safe processing of H₂S gas is crucial in oil and natural gas extraction operations and should be carried out as quickly and efficiently as possible [See: Elkatatny, S., Basfer, S., Shawabkeh, R., Bahgat, M., Mahmoud, M., 2019a. Assessment of Using Copper Nitrate for Scavenging Hydrogen Sulfide While Drilling Sour Horizontal Wells. J. Energy Resour. Technol. 141; and Tarver, G. A., Dasgupta, P. K., 1995. Design and Development of a System to Measure Ambient Levels of Hydrogen Sulfide and Lower Mercaptans from a Mobile Platform. Atmos. Environ. 29, 1291-1298]. A variety of techniques and chemicals were applied in drilling operations to scavenge H₂S gas. Hydrogen peroxide (H₂O₂) has been utilized as an H₂S scavenger, but its reactive nature makes it unsuitable for drilling fluid applications since it is a non-selective oxidizing agent and within a short period of time dissipates by reacting with the other drilling fluid components, leading to uncontrollable scavenging process [See: Amosa, M., Mohammed, I., Yaro, S., 2010. Sulphide Scavengers in Oil and Gas Industry—A Review. NAFTA 61, 85-92; Browning, W. C., Young, H. F., 1975. Process for Scavenging Hydrogen Sulfide in Aqueous Drilling Fluids and Method of Preventing Metallic Corrosion of Subterranean Well Drilling Apparatuses. 3928211; Carney, L. L., Jones, B., 1974. Practical Solutions to Combat the Detrimental Effects of Hydrogen Sulfide During Drilling Operations, in: SPE Symposium on Sour Gas and Crude, Tyler, Texas, November 11-12. SPE; and Dyke, O. V. W., Wagner, K. L., 1970. Drilling Mud Composition and Process. 3506572].

Copper-containing chemicals, such as copper carbonate ($CuCO_3$), were used as metal-based H₂S scavengers to produce a stable and insoluble copper sulfide. These compounds have fast reaction kinetics with H₂S gas, resulting in an efficient scavenging process. However, the electro-deposition of copper on the metal surface causes corrosion problems, as confirmed in many cases in oil and gas fields [See: Agbroko, O. W., Piler, K., Benson, T. J., 2017. A Comprehensive Review of H₂S Scavenger Technologies from Oil and Gas Streams. ChemBioEng Rev. 4, 339-359; Carney, L. L., Jones, B., 1974. Practical Solutions to Combat the Detrimental Effects of Hydrogen Sulfide During Drilling Operations, in: SPE Symposium on Sour Gas and Crude, Tyler, Texas, November 11-12. SPE; Chilingar, G. V., Mourhatch, R., Al-Qahtani, G. D., 2008. Introduction to Corrosion, in: The Fundamentals of Corrosion and Scaling for Petroleum & Environmental Engineers. Elsevier, pp. 1-34; Davidson, E., Hall, J., Temple, C., 2004. A New Iron-Based, Environmentally Friendly Hydrogen Sulfide Scavenger for Drilling Fluids. SPE Drill. Complet. 19, 229-234; Dyke, O. V. W., Wagner, K. L., 1970. Drilling Mud Composition and Process. 3506572; and Garrett, R. L., Clark, R. K., Carney, L. L., Grantham, C. K., 1979. Chemical Scavengers for Sulfides in Water-Base Drilling Fluids. J. Pet. Technol. 31, 787-796]. Copper nitrate ($Cu(NO_3)_2$) was proposed as an H₂S scavenger with less affinity to corrosion. The scavenging capacity of the copper nitrate solution was only explored in laboratory tests for water-based drilling fluid, however, it is yet to be applied in the field [See: Elkatatny, S., Basfer, S., Shawabkeh, R., Bahgat, M., Mahmoud, M., 2019a. Assessment of Using Copper Nitrate for Scavenging Hydrogen Sulfide While Drilling Sour Horizontal Wells. J. Energy Resour. Technol. 141; and Elkatatny, S., Shawabkeh, R., Mahmoud, M., 2019b. Method for Drilling a Hydrogen Sulfide-Containing Formation. 10479919B2].

Zinc compounds, such as ZnO and $ZnCO_3$, were also tested in the field of H₂S scavenging. These compounds are thermally stable and have amphoteric nature [See: Bagreev, A., Bashkova, S., Locke, D. C., Bandosz, T. J., 2001. Sewage Sludge-Derived Materials as Efficient Adsorbents for Removal of Hydrogen Sulfide. Environ. Sci. Technol. 35, 1537-154; Davidson, E., 2002. Method and Composition for Scavenging Sulphid in Drilling Fluids. 6746611B2; Garrett, R. L., Clark, R. K., Carney, L. L., Grantham, C. K., 1979. Chemical Scavengers for Sulfides in Water-Base Drilling Fluids. J. Pet. Technol. 31, 787-796; Palmer, B. R., Gutierrez, C., Gidas, M.-B., Berrouk, A., Gawargy, M. W. H., 2011. Rate Phenomena in the Reaction of Hydrogen Sulfide with a Zinc Oxide-Based Sorbent. Environ. Prog. Sustain. Energy 30, 384-391; Sayyadnejad, M. A., Ghaffarian, H. R., Saeidi, M., 2008. Removal of Hydrogen Sulfide by Zinc Oxide Nanoparticles in Drilling Fluid. Int. J. Environ. Sci. Technol. 5, 565-569; Sun, J., Modi, S., Liu, K., Lesieur, R., 2007. Kinetics of Zinc Oxide Sulfidation for Packed-Bed Desulfurizer Modeling. Energy & Fuels 21, 1863-1871; and Sunde, E., Olsen, H., 1999. Removal of H₂S in Drilling Mud. 6365053B1]. The drawback of utilizing zinc-based scavengers is their potential environmental impacts. In addition, the inclusion of higher amounts of zinc compounds deteriorates the mud rheology and causes flocculation and fluid losses, especially at high pH [See: Aftab, A., Ismail, A. R., Khokhar, S., Ibupoto, Z. H., 2016. Novel Zinc Oxide Nanoparticles Deposited Acrylamide Composite Used for Enhancing the Performance of Water-Based Drilling Fluids at Elevated Temperature Conditions. J. Pet. Sci. Eng. 146, 1142-1157; Agbroko, O. W., Piler, K., Benson, T. J., 2017. A Comprehensive Review of H₂S Scavenger Technologies from Oil and Gas Streams. ChemBioEng Rev. 4, 339-359; Beck, F. E., Boone, D. E., DesBrandes, R., Wojtanowicz, A.

K., Johnson, P. W., Lyons, W. C., Miska, S., Mujeeb, A., Nathan, C., Russell, C. S., Shahraki, A. K., 1996. Drilling and Well Completions, in: Standard Handbook of Petroleum and Natural Gas Engineering. Elsevier, pp. 497-1384; Davidson, E., Hall, J., Temple, C., 2003. An Environmentally Friendly, Highly Effective Hydrogen Sulphide Scavenger for Drilling Fluids, in: SPE Annual Technical Conference and Exhibition, Denver, Colorado, October 5-8. SPE; and Saji, V. S., 2021. Research Advancements in Sulfide Scavengers for Oil and Gas Sectors. Rev. Chem. Eng. 37, 663-686].

Iron compounds, such as active and magnetic iron oxides, were also employed to scavenge $H_2S$ [See: Fox, I., 1982. Method of Using a Reactive Iron Oxide Drilling Mud Additive. 4324298; Gilligan III, T. J., 1985. Removal of Hydrogen Sulfde from Drilling Fluids. 4548720 and Lin, H., King, A., Williams, N., Hu, B., 2017. Hydrogen Sulfide Removal via Appropriate Metal Ions Dosing in Anaerobic Digestion. Environ. Prog. Sustain. Energy 36, 1405-1416]. The addition of these compounds results in an increase in mud density, with greater effectiveness observed at lower PH levels. However, the drilling fluid typically operates within alkaline pH range, which can negatively impact the reaction kinetics [See: da Silva, F. T., 2005. Hydrogen Sulphide Scavenging by Porous Magnetite. Miner. Process. Extr. Metall. 114, 245-247; Evers, J. F., Olson, G. A., 1983. A Comparative Analysis of Reactivities of Commercial Iron and Zinc Compounds Used in the Removal of $H_2S$ From Drilling Fluids, in: SPE Rocky Mountain Regional Meeting, Salt Lake City, Utah, May 22-25. SPE; Garrett, R. L., Clark, R. K., Carney, L. L., Grantham, C. K., 1979. Chemical Scavengers for Sulfides in Water-Base Drilling Fluids. J. Pet. Technol. 31, 787-796; Ray, J. D., Randall, B. V., Parker, J. C., 1979. Use of Reactive Iron Oxide To Remove $H_2S$ From Drilling Fluid. J. Pet. Technol. 31, 797-801; Samuels, A., 1974. $H_2S$ Need Not Be Deadly, Dangerous, Destructive, in: SPE Symposium on Sour Gas and Crude, Tyler, Texas, November 11-12; and Samuels, A., Wendt, R. P., 1981. Proper Fluid Pretreatment To Minimize Hydrogen Sulfide Dangers, in: Middle East Technical Conference and Exhibition, Bahrain, March 9-12. Society of Petroleum Engineers].

Aldehydes were also applied for removing $H_2S$ gas during drilling operations. However, their applications are limited due to their high cost and the complex $H_2S$ scavenging reaction kinetics as well as the concerns over their negative health impacts [See: Nasr-El-Din, H. A., Al-Humaidan, A. Y., Fadhel, B. A., Frenier, W. W., Hill, D. G., 2002. Investigation of Sulfide Scavengers in Well-Acidizing Fluids. SPE Prod. Facil. 17, 229-235; and Sitz, C. D., Barbin, D. K., Hampton, B. J., 2003. Scale Control in a Hydrogen Sulfide Treatment Program, in: International Symposium on Oilfield Chemistry, Houston, Texas, February 5-7. SPE]. Hence, there is still an unmet need to develop $H_2S$ scavengers that are feasible for the oil and gas industry applications and can completely and quickly remove $H_2S$ without producing undesirable by-products.

In view of the foregoing, one objective of the present disclosure is to describe a drilling fluid composition. A further objective of the present disclosure is to describe a method for reducing the hydrogen sulfide ($H_2S$) content of a $H_2S$-containing subterranean formation. A third objective of the present disclosure is to describe a process for removing hydrogen sulfide ($H_2S$) from a $H_2S$-containing gas composition by the drilling fluid composition.

SUMMARY

In an exemplary embodiment, a drilling fluid composition is described. The drilling fluid composition includes a base fluid, at least one additive selected from the group consisting of an anti-foaming agent, a fluid-loss additive, a viscosity modifier, a shale stabilizer, an alkali compound, a bridging agent, and a weighting agent. Further, the drilling fluid composition includes 0.01 to 0.5 weight percentage (wt. %) of particles of steel slag, based on a total weight of the drilling fluid composition. The steel slag particles have an irregular shape and an average particle size ($D_{50}$) in a range of 5 to 20 micrometers (μm).

In some embodiments, the steel slag has an average particle size ($D_{50}$) of 11 to 13 μm.

In some embodiments, the drilling fluid composition includes iron gluconate particles having an average particle size ($D_{50}$) in a range of 10 to 60 μm. In some embodiments, the steel slag includes 30 to 60 wt. % zinc oxide (ZnO), 20 to 50 wt. % sodium oxide ($Na_2O$), 5 to 25 wt. % chlorine (Cl), and 0.5 to 6 wt. % ferric oxide ($Fe_2O_3$), each wt. % is based on a total weight of the steel slag as determined by X-ray fluorescence (XRF).

In some embodiments, the drilling fluid composition includes 0.01 to 0.1 wt. % of the anti-foaming agent selected from the group consisting of polydimethylsiloxane, fatty acid ester, silicon dioxide, and vegetable oil, 0.01 to 0.5 wt. % of the viscosity modifier selected from the group consisting of a clay, a saccharide, a polysaccharide, a cellulose, an acrylate polymer and copolymer, and a polyvinyl polymer and copolymer, 0.5 to 5 wt. % of the fluid-loss additive selected from the group consisting of a starch, a starch derivative, a cellulose, and a cellulose derivative, 5 to 20 wt. % of the shale stabilizer selected from the group consisting of a sodium salt, and a sulfonated asphalt, 0.01 to 0.5 wt. % of the alkali compound selected from the group consisting of caustic soda and soda ash, 1 to 10 wt. % of the bridging agent selected from the group consisting of sodium borate, boric oxide, calcium carbonate, and magnesium oxide, 20 to 40 wt. % of the weighting agent selected from the group consisting of barite and hematite, and 45 to 65 wt. % of the base fluid, each wt. % based on a total weight of the drilling fluid composition.

In another exemplary embodiment, a method for reducing a hydrogen sulfide ($H_2S$) content of a $H_2S$-containing subterranean formation is described. The method includes drilling the $H_2S$-containing subterranean formation to form a wellbore therein, injecting the drilling fluid composition into the wellbore during the drilling and circulating the drilling fluid composition in the wellbore, and recovering a product stream from the $H_2S$-containing subterranean formation.

In some embodiments, the drilling fluid composition includes 0.1 to 0.3 wt. % of the steel slag particles, based on the total weight of the drilling fluid composition. In some embodiments, the steel slag has an average particle size ($D_{50}$) of 11 to 13 μm.

In some embodiments, the drilling fluid composition has an $H_2S$ absorption capacity of up to 300 mg/L based on a total volume of the drilling fluid composition.

In some embodiments, the drilling fluid composition has a pH of 10 to 12.

In some embodiments, the drilling fluid composition has a plastic viscosity (PV) of 30 to 50 centipoise (cP).

In some embodiments, the drilling fluid composition has a yield point (YP) of 80 to 120 pounds per one hundred square feet (lb/100 ft$^2$).

In some embodiments, the drilling fluid composition has a gel strength value of 5 to 10 lb/$_{100}$ ft$^2$.

In some embodiments, the drilling fluid composition has a filtrated volume of no more than 10 cubic centimeter (cm³), as determined by American Petroleum Institute (API) standard procedures (API, 2019).

In some embodiments, the drilling fluid composition has a corrosion rate of less than $0.9 \times 10^{-5}$ pounds per square feet (lb/ft²), as determined by American Petroleum Institute (API) standard procedures (API, 2019).

In some embodiments, the $H_2S$ is present in the $H_2S$-containing subterranean formation at a concentration in a range of 50 to 200 parts per million by volume (ppmv) based on a total volume of the $H_2S$-containing subterranean formation.

In some embodiments, the method has a $H_2S$ breakthrough time of at least 40 minutes.

In some embodiments, the wellbore is at least one of a vertical wellbore, a deviated wellbore, a multilateral wellbore, and a horizontal wellbore.

In some embodiments, the subterranean formation includes at least one selected from the group consisting of an oil shale formation, a tar sands formation, a coal formation, and a conventional hydrocarbon formation.

In yet another exemplary embodiment, a process for removing hydrogen sulfide ($H_2S$) from a $H_2S$-containing gas composition by the drilling fluid composition is described. The process is preferably a static process that includes introducing and/or loading the drilling fluid composition including the steel slag particles in a column, introducing the $H_2S$-containing gas composition to the column containing the drilling fluid composition, and passing the $H_2S$-containing gas composition through the drilling fluid composition, and adsorbing the $H_2S$ from the $H_2S$-containing gas composition onto the steel slag particles of the drilling fluid composition to remove the $H_2S$ from the $H_2S$-containing gas composition and form a purified gas composition. In one embodiment the column may be subject to a counter current flow of a liquid such as an aqueous alkaline or acidic solution. In this embodiment the volume of the $H_2S$-containing gas composition passing through the steel slag particles is at least 10 times the volume of the liquid passing through the steel slag particles in counter current flow.

In some embodiments, the $H_2S$ is present in the $H_2S$-containing gas composition at a concentration in a range of 50 to 200 parts per million by volume (ppmv) based on a total volume of the $H_2S$-containing gas composition.

In some embodiments, the $H_2S$-containing gas composition is introduced to the column at a rate of 1 to 150 milliliters per minute (mL/min) per milligram of the steel slag particles dispersed in the drilling fluid composition.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9A is a graphical representation showing weights of base mud, SourScav® mud and steel waste mud in a filtration test result, according to certain embodiments;

FIG. 9B is a graphical representation showing thickness of base mud, SourScav® mud and steel waste mud in the filtration test result, according to certain embodiments;

FIG. 9C is a graphical representation showing filtrated volume of base mud, SourScav® mud and steel waste mud in the filtration test result, according to certain embodiments;

DETAILED DESCRIPTION

Figure 1:
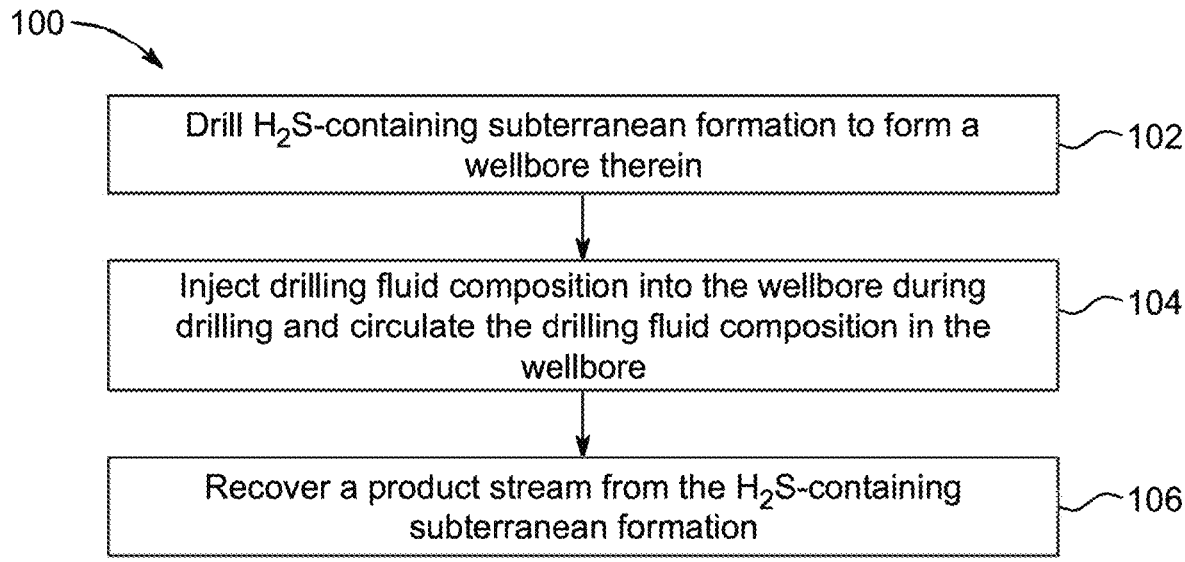
FIG. 1 is a schematic flow diagram of a method for reducing a hydrogen sulfide ($H_2S$) content of a $H_2S$-containing subterranean formation using a drilling fluid composition, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, "steel waste," or "steel slag" generally refers to any discarded materials, byproducts, or products that are made of steel or contain steel components. This can include manufacturing scrap, and steel trimmings. In the present disclosure, steel slag is a byproduct of steel production that is formed during the separation of molten steel from impurities in the furnace.

As used herein, the term "drilling" generally refers to a process of creating a hole or wellbore in the earth's surface by using a drilling rig, a machine that rotates a drill bit to cut through rocks, soil, and other materials.

As used herein, the term "corrosion" generally refers to a natural process that occurs when a material (usually a metal) is gradually deteriorated by chemical or electrochemical reactions with its surrounding environment, leading to a loss of material and eventual failure of the material.

As used herein, the term "scavenging capacity" generally refers to the ability of a substance or chemical to remove or reduce the concentration of another substance or chemical from a solution or system by chemically reacting with it. In the present disclosure, it refers to the ability of a substance to remove $H_2S$ from a $H_2S$ containing mixture or fluid. The scavenging capacity of a substance is typically measured by its ability to react with and remove a specific target substance.

Aspects of the present disclosure are directed to a drilling fluid composition comprising a steel slag and a method of preparation thereof. In the present disclosure, steel industry waste is used as a hydrogen sulfide ($H_2S$) scavenger in water-based muds (WBM). More particularly, steel slag is used to improve the $H_2S$ scavenging capacity of WBM. The drilling fluid tests were conducted to investigate the influence of adding steel slag on alkalinity, rheology, filtration performance, and corrosion rate. Introducing and evaluating steel slag as an $H_2S$ scavenger provides for safe and efficient drilling operations, thereby transforming this waste from being economic and environmental burden into a useful commodity.

In an embodiment of the present disclosure, the drilling fluid composition includes a base fluid. The base fluid may be tap water, ground water, distilled water, deionized water, saltwater, hard water, fresh water, and wastewater, seawater, brine, saturated brine, or a formate brine. For purposes of this description, the term "saltwater" may include saltwater with a chloride ion content of between about 6000 ppm and saturation, and is intended to encompass seawater and other types of saltwater including groundwater containing additional impurities typically found therein. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The type of base fluid selected depends on anticipated wellbore conditions or on the specific interval of the wellbore being drilled. In some embodiments, practical field mud recipe was used to prepare 350 cubic centimeters ($cm^3$) of water-based drilling fluid samples using fresh water as the base fluid. In some more preferred embodiments, the proportion of the base fluid is 45 to 65 weight percentage (wt. %), each wt. % based on a total weight of the drilling fluid composition. Other ranges are also possible.

The drilling fluid composition also includes at least one additive selected from the group consisting of an antifoaming agent, a fluid-loss additive, a viscosity modifier, a shale stabilizer, an alkali compound, a bridging agent, and a weighting agent.

The antifoaming agent is added to prevent or counter foam generation in the formulation. Generally, these agents have surface active properties and are insoluble in the foaming medium. The antifoaming agent is preferably a certain alcohol (e.g., cetostearyl alcohol), insoluble oils (castor oil), stearates, polydimethylsiloxanes, and other silicone derivatives, ether, and glycols. In the present disclosure, a defoamer is preferably used. Many types of chemicals, such as liquid surfactants as well as solid particles, help reduce surface tension and thus rupture bubbles. Examples of defoaming agents are, but not limited to 2-octanol, oleic acid, paraffinic waxes, amide waxes, sulfonated oils, organic phosphates, silicone oils, mineral oils, and dimethylpolysiloxane. In an embodiment, the composition contains 0.01 to 0.1 wt. % of an antifoaming agent selected from the group consisting of polydimethylsiloxane, fatty acid ester, silicon dioxide, and vegetable oil.

The fluid loss additives are also called filtrate-reducing agents. Fluid losses may occur when the fluid comes in contact with a porous formation. This is relevant for drilling and completion fluids, fracturing fluids, and cement slurries. The fluid loss additive is a typical fluid loss controller which may include, but is not limited to, polyacrylamide, polyethyleneamines, carboxymethyl hydroxyethyl cellulose (CMHEC), and hydroxyethyl cellulose (HEC). In an embodiment, the composition contains 0.5 to 5 wt. % of a fluid-loss additive selected from the group consisting of a starch, a starch derivative, a cellulose, and a cellulose derivative. In the present disclosure, the starch and polyanionic cellulose-regular viscosity (PAC-R) are the fluid loss controller.

Viscosity modifiers (VMs) are polymeric molecules that are sensitive to temperature. At low temperatures, the molecule chain contracts and does not impact the fluid viscosity. At high temperatures, the chain relaxes and an increase in viscosity occurs. An additive used for oil-base and synthetic-base muds provides high viscosity at low shear rates. It is useful when drilling high-angle and horizontal wells and can be critical for cuttings carrying and to prevent sag and settling of weighting material. The viscosity modifier is of two categories thickeners and viscosity index improvers. VMs possess an improved viscosity index, enhanced thickening efficiency, and appropriate shear stability. In an embodiment, the composition contains 0.01 to 0.5 wt. % of a viscosity modifier selected from the group consisting of a clay, a saccharide, a polysaccharide, a cellulose, an acrylate polymer and copolymer, and a polyvinyl polymer and copolymer.

The shale-stabilizing drilling fluids for use in connection with subterranean well drilling operations. They prevent dispersion and minimize swelling that causes downhole problems, including stuck, bit balling and excessive mud weights. These products will improve core recovery and enhance drilling fluid integrity in difficult formations. The drilling fluids contain polyvalent metal/guanidine complexes, especially aluminum/guanidine complexes, and preferably contain guanidinium ion and aluminate ion accompanied by cationic starches and a glycol selected from the group consisting of polybutylene glycol, polyethylene glycol, polypropylene glycol and mixtures thereof. In an embodiment, the composition contains 5 to 20 wt. % of a shale stabilizer selected from the group consisting of a sodium salt, and a sulfonated asphalt. In the present disclosure, sodium chloride (NaCl) is used as the shale stabilizer.

The drilling mud lower than pH 7 suggests it being acidic, which leads to pitting, corrosive to materials and equipment, and simultaneously result in environmental pollution. Therefore, maintaining the pH of the drilling fluid within defined standard range is important during drilling operations. Examples of strong alkalis (lyes) include barium, sodium, ammonium, calcium, lithium, and potassium hydroxides. The alkali compounds are categorized in three main chemical components which involved in alkalinity of drilling fluid, which are bicarbonate ions ($HCO_{3-}$), hydroxyl ions ($OH^-$), and carbonate ions ($CO_3^{-2}$). Alkalinity means ions that will reduce acidity. In an embodiment, the composition contains 0.01 to 0.5 wt. % of an alkali compound selected from the group consisting of a caustic soda and soda ash. The caustic soda is used as an alkali compound. It is a strong alkali used to increase or maintain the pH and alkalinity in drilling mud and petroleum fractions. The alkalinity controllers, such as the caustic soda, have been proposed to elevate the pH and react with $H_2S$, however, any drop in pH or increase in temperature causes reversible reaction and regeneration of $H_2S$, which makes this technique ineffective when no other $H_2S$ scavengers are added to the drilling mud formulation.

The bridging agents are the solids added to a drilling fluid to bridge across the pore throat or fractures of exposed rock, thereby building a filter cake to prevent loss of whole mud or excessive filtrate. The bridging materials are commonly used in drilling fluids and in lost circulation treatments. In a preferred embodiment, the composition contains 1 to 10 wt. % of a bridging agent selected from the group consisting of sodium borate, boric oxide, calcium carbonate, and magnesium oxide. Calcium carbonate ($CaCO_3$) is widely used as bridging material (BM) and weight additive in drilling fluids owing to its high hardness, high acid-soluble rate, and high economic benefit to plug the pore throats or fractures for preventing the formation damage caused by the drilling-fluid loss and adjust the drilling-fluid.

The weighting agent is a material that, when added to drilling fluid, increases its density. The most commonly used weighting agents in the drilling industry are barite and hematite, which meet specifications by the American Petroleum Institute (API) and the International Organization for Standardization (ISO). The Weighting agents such as barite, micromax, ilmenite, and hematite are commonly added to drilling fluids to produce high-density fluids that could be used to drill deep oil and gas wells. Increasing the drilling fluid density leads to highly conspicuous fluctuation in the drilling fluid characteristics. In a preferred embodiment, barite is used as the weighing agent. Barite ($BaSO_4$) is chemically inert and insoluble. It occurs as a vein filling and as a gangue mineral in silver, zinc, copper, nickel and lead ores. Barite with a specific gravity of 4.2-4.4 and hardness 2.3-3.5 has been the most common weight material for drilling fluids. In an embodiment, the composition contains 20 to 40 wt. % of a weighting agent selected from the group consisting of barite and hematite.

In some embodiments, the drilling fluid composition is substantially free of an additive (e.g., viscosity modifying agent, a chelating agent, a stabilizing agent, a dispersing agent, a corrosion inhibitor, a scale inhibitor, a stabilizing agent, and a defoaming agent). In some embodiments, the drilling fluid composition is substantially free of polymers, including both water-soluble and oil-soluble polymers. In preferred embodiments the drilling fluid composition is substantially free of a polysaccharide (e.g., xanthan gum, scleroglucan, and diutan) and a quaternary ammonium surfactant.

Figure 3:
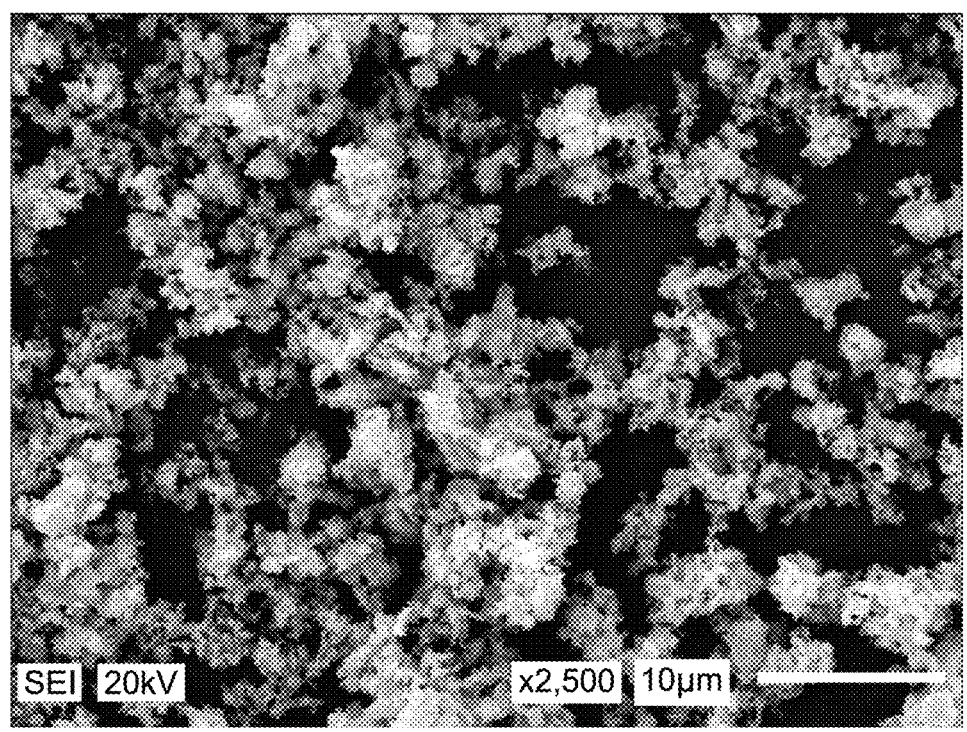
FIG. 3 shows a scanning electron microscope (SEM) image depicting an irregular shape of steel slag particles that differs in size with a normal distribution, according to certain embodiments.

According to present disclosure, the steel slag is also a major part of the drilling fluid composition. The drilling fluid composition includes 0.01 to 0.5 wt. % of particles of steel slag, based on a total weight of the drilling fluid composition, preferably 0.05 to 0.4 wt. %, or even more preferably 0.1 to 0.3 wt. % based on the total weight of the drilling fluid composition. The steel slag particles have an irregular shape, and an average particle size ($D_{50}$) in a range of 5 to 20 micrometers (μm), preferably 7 to 18 μm, preferably 9 to 16 μm, or even more preferably 11 to 14 μm, as shown in FIG. 3. Other ranges are also possible. In some embodiments, the steel slag has an average particle size ($D_{50}$) of 11 to 13 μm, or even more preferably about 11.77 μm. In some further embodiments, 0.1 to 0.3 wt. % of the particles of steel slag are present in the drilling fluid composition. The drilling fluid composition may further include iron gluconate ($Fe(C_6H_{12}O_7)_2$) particles having an average particle size ($D_{50}$) in a range of 10 to 60 μm, preferably 15 to 55 μm, preferably 20 to 50 μm, preferably 25 to 45 μm, preferably 30 to 40 μm, or even more preferably about 35 μm. In some preferred embodiments, the iron gluconate may be present in the drilling fluid composition at a concentration of 0.01 to 0.5 wt. %, preferably 0.05 to 0.4 wt. %, or even more preferably 0.1 to 0.3 wt. % based on the total weight of the drilling fluid composition.

As used herein, the term "X-ray fluorescence," or "XRF" generally refers to a non-destructive analytical technique used to determine the chemical composition of materials. In the present disclosure, the XRF may be performed on a M4 Tornado X-ray fluorescence (XRF) spectrometer and operated according to the manual corresponding to the spectrometer.

In some embodiments, the steel slag includes 30 to 60 wt. % zinc oxide (ZnO), 20 to 50 wt. % sodium oxide ($Na_2O$), 5 to 25 wt. % chlorine (Cl), and 0.5 to 6 wt. % ferric oxide ($Fe_2O_3$), and each wt. % based on a total weight of the steel slag as determined by X-ray fluorescence (XRF). In some further embodiments, the steel slag includes 40 to 50 wt. % zinc oxide (ZnO), 30 to 40 wt. % sodium oxide ($Na_2O$), 10 to 20 wt. % chlorine (Cl), and 2 to 4 wt. % ferric oxide ($Fe_2O_3$), each wt. % based on the total weight of the steel slag as determined by XRF. In some further preferred embodiments, the steel slag includes about 43.3% ZnO, about 33.8% $Na_2O$, about 14.3% Cl, and about 2.9% $Fe_2O_3$. Other ranges are also possible.

Referring to FIG. 1, a schematic flow diagram of a method 100 for reducing a hydrogen sulfide ($H_2S$) content of $H_2S$-containing subterranean formation is illustrated, according to an embodiment. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes drilling the $H_2S$-containing subterranean formation to form a wellbore. In an embodiment, the wellbore is at least one of a vertical wellbore, a deviated wellbore, a multilateral wellbore, and a horizontal wellbore. The subterranean formation includes at least one is selected from the group consisting of an oil shale formation, a tar sands formation, a coal formation, and a conventional hydrocarbon formation.

At step 104, the method 100 includes injecting the drilling fluid composition into the wellbore during the drilling and circulating the drilling fluid composition in the wellbore. In some embodiments, the drilling fluid composition includes 0.1 to 0.3 wt. % of the steel slag particles, preferably about 0.2 wt. % of the steel slag particles, based on the total weight of the drilling fluid composition. The steels slag has the average particle size ($D_{50}$) of 11 to 13 μm, or more preferably about 12 μm.

Figure 4:
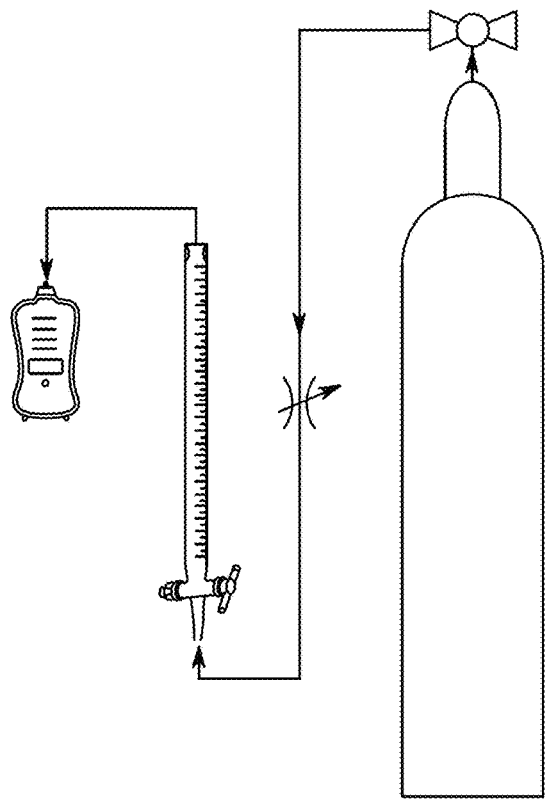
FIG. 4 is a schematic diagram showing an experimental setup for performing $H_2S$ scavenging test, according to certain embodiments.
Figure 5:
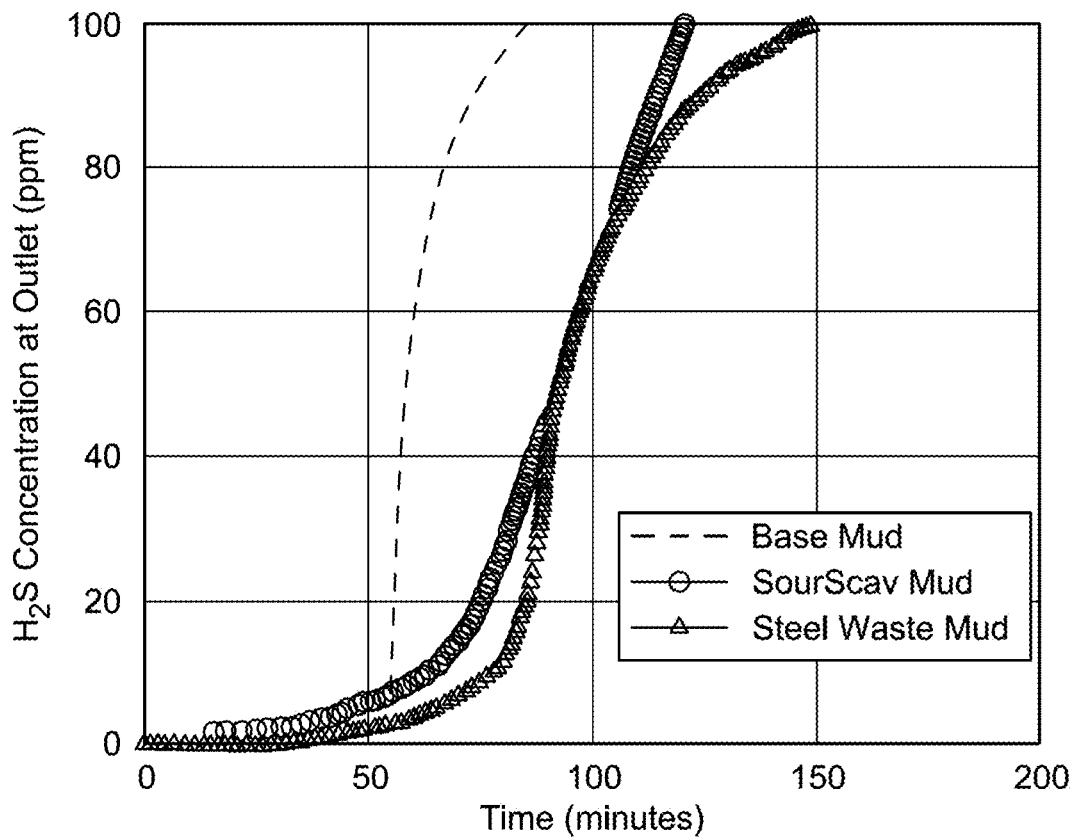
FIG. 5 is a graphical representation showing results of $H_2S$ sorption test in base mud, SourScav® mud and steel waste mud, according to certain embodiments.

FIG. 4 illustrates an experimental setup for performing $H_2S$ scavenging test. The scavenging test may be performed at atmospheric pressure and a temperature of 20 to 30° C., or preferably about 22 to 25° C. A lower end of a column is in fluid communication with a $H_2S$-containing gas composition via a flow meter. A higher end of the column is in fluid communication with a $H_2S$ gas detector for real time $H_2S$ concentration measurement and recording, enabling the construction of $H_2S$ breakthrough curves and the calculation of the amount of $H_2S$ scavenged as depicted in FIG. 5. In some embodiments, the drilling fluid composition having a volume of 5 to 20 ml, preferably about 10 ml is introduced in the column. In some further embodiments, the $H_2S$-containing gas composition is introduced into the column via the flow meter and passed through the drilling fluid composition thereby absorbing $H_2S$ onto the particles of the steel slag presented in the drilling fluid composition. In some embodiments, the $H_2S$ gas is present in the $H_2S$-containing gas composition at a concentration in a range of 50 to 200 parts per million by volume (ppmv) based on a total volume of the $H_2S$-containing gas composition, preferably about 100 ppmv. In some further embodiments, the time taken for $H_2S$ breakthrough is at least 40 minutes, preferably at least 70 minutes, or even more preferably about 90 minutes. Other ranges are also possible.

As used herein, the term "breakthrough time" refers to the elapsed time between initial contact of the drilling fluid composition with the $H_2S$-containing gas composition and the time at which $H_2S$ is detected after absorption. In accordance with the present disclosure, the detection limit for $H_2S$ in a gas composition is 0.5 ppm, based on a total weight of the gas composition.

In some embodiments, the drilling fluid composition has a $H_2S$ absorption capacity of up to 300 milligrams per liters (mg/L) based on a total volume of the drilling fluid composition according to the equation described in Murtaza et al. [Murtaza, M., Alarifi, S. A., Abozuhairah, A., Mahmoud, M., Onaizi, S. A., Al-Ajmi, M., 2021. Optimum Selection of $H_2S$ Scavenger in Light-Weight and Heavy-Weight Water-Based Drilling Fluids. ACS Omega 6, 24919-24930, incorporated herein by reference in its entirety], preferably up to 250 mg/L, or even more preferably up to 200 mg/L based on the total volume of the drilling fluid composition. In some preferred embodiments, the drilling fluid composition has a pH of 10 to 12, or preferably about 11.

As used herein, the term "plastic viscosity (PV)" generally refers to the resistance of a drilling fluid to flow under mechanical stress or shear, which is measured in centipoise (cp).

As used herein, the term "yield point (YP)" generally refers to a rheological parameter that represents the minimum amount of shear stress required for a drilling fluid to begin to flow.

As used herein, the term "gel strength" generally refers to a measurement of the strength of a drilling fluid under mechanical stress.

The rheological tests may be determined by American Petroleum Institute (API) standard procedures (API, 2019). The drilling fluid composition is performed at a temperature of 80 to 160° F., preferably about 120° F. on an OFITE viscometer model 900. The viscometer may be set at a rotation speed of 0.01 to 900 revolutions per minute (rpm), preferably 3 to 600 rpm.

Figure 7:
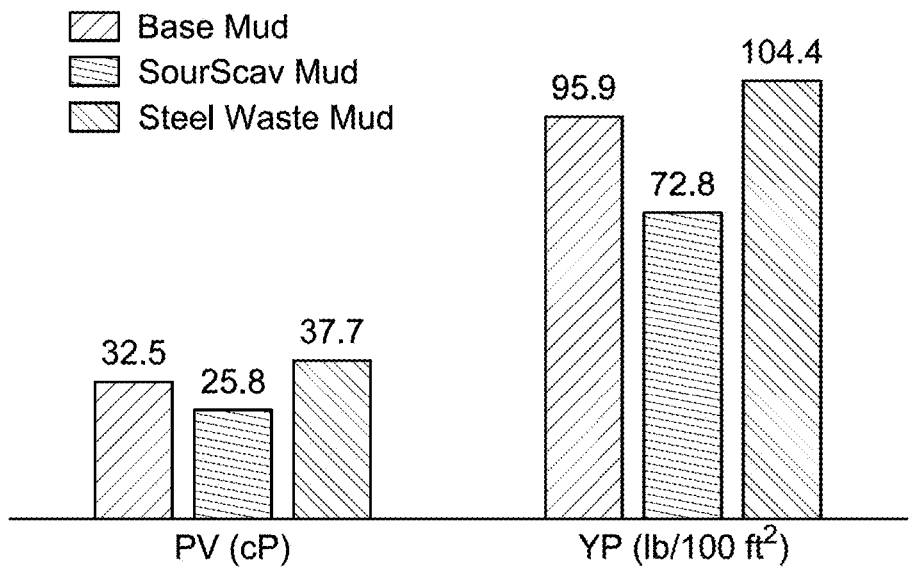
FIG. 7 is a graphical representation showing resulted plastic viscosity (PV) and yield point (YP) in base mud, SourScav® mud and steel waste mud, according to certain embodiments.
Figure 8:
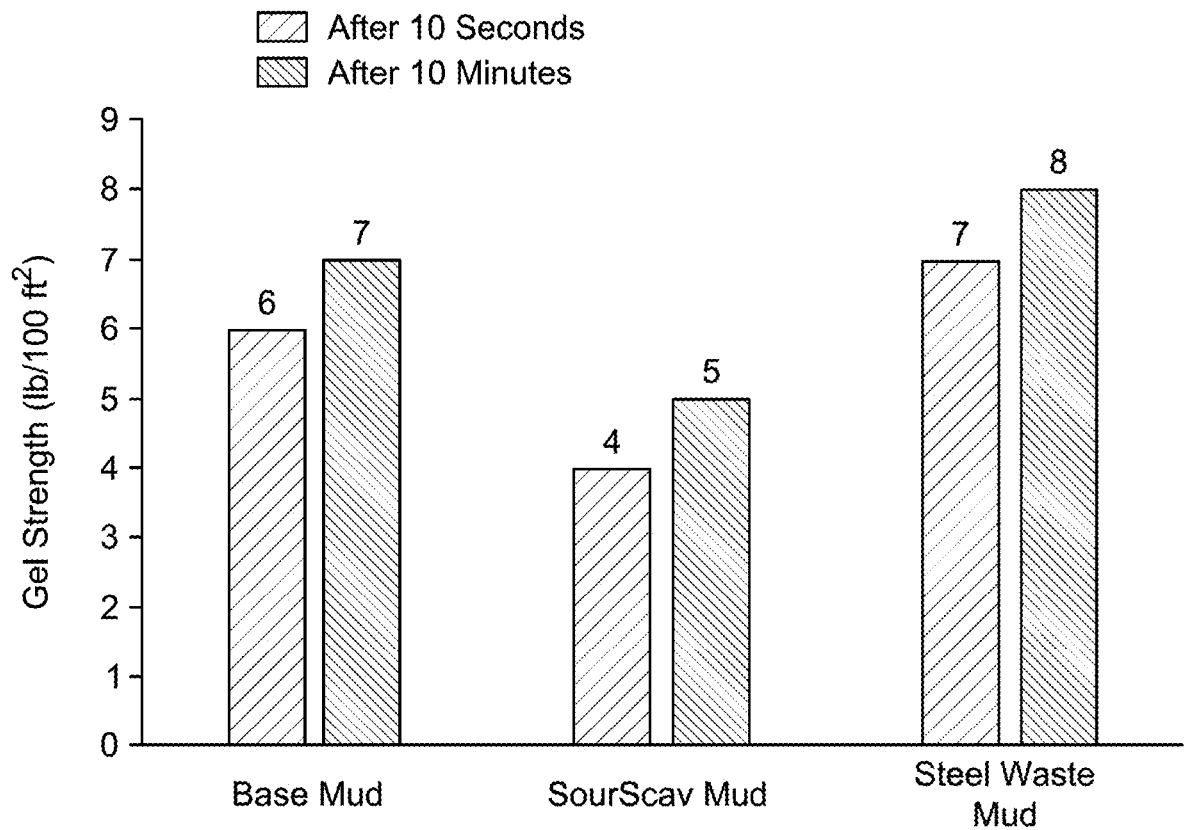
FIG. 8 is a graphical representation showing resulted gel strengths in base mud, SourScav® mud and steel waste mud, according to certain embodiments.
Figure 10A:
FIG. 10A shows a composed filter cake with base mud, according to certain embodiments.
Figure 10B:
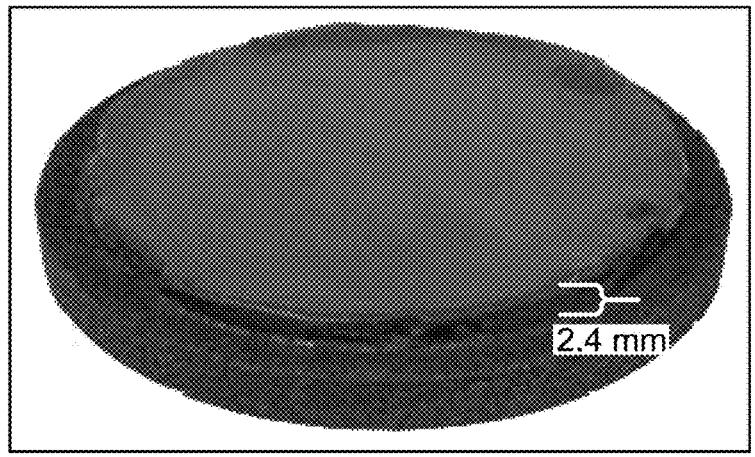
FIG. 10B shows a composed filter cake with SourScav® mud, according to certain embodiments.
Figure 10C:
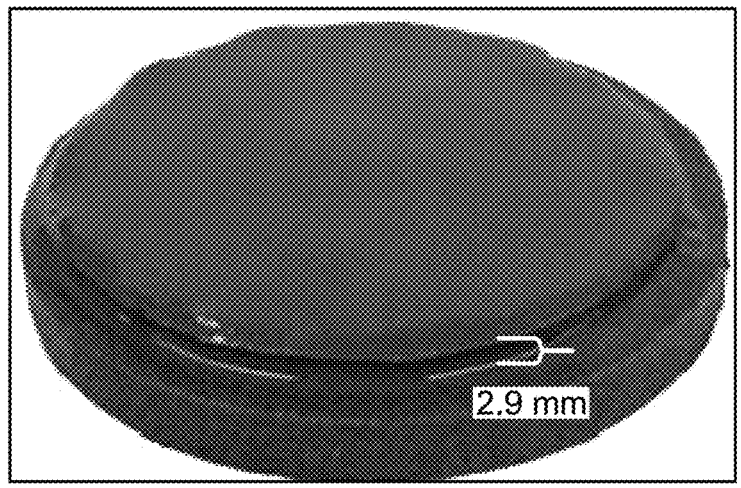
FIG. 10C shows a composed filter cake with steel-waste mud, according to certain embodiments.

FIG. 7 shows the results of the PV and YP. In some embodiments, the drilling fluid composition has a plastic viscosity (PV) of 30 to 50 centipoise (cP), preferably about 40 cP. In some further embodiments, the drilling fluid composition has a yield point (YP) of 80 to 120 pounds per one hundred square feet (lb/100 ft$^2$), preferably about 100 lb/100 ft$^2$. In some preferred embodiments, the drilling fluid composition has a gel strength value of 5 to 10 lb/100 ft$^2$, preferably about 7.5 lb/100 ft$^2$, as depicted in FIG. 8. In some more preferred embodiments, the drilling fluid composition has a filtrated volume of no more than 10 cubic centimeter (cm$^3$), preferably no more than 8 cm$^3$, as determined by American Petroleum Institute (API) standard procedures (API, 2019), as depicted in FIG. 9A to 9C. The drilling fluid composition has a corrosion rate of less than $0.9 \times 10^{-5}$ pounds per square feet (lb/ft$^2$), preferably less than 0.5 lb/ft$^2$, as determined by American Petroleum Institute (API) standard procedures (API, 2019).

At step 106, the method 100 includes recovering a product stream from the $H_2S$-containing subterranean formation. The $H_2S$ gas is present in the $H_2S$-containing subterranean formation at a concentration in a range of 50 to 200 parts per million by volume (ppmv) based on a total volume of the $H_2S$-containing subterranean formation, or even more preferably about 100 ppmv. The time taken for $H_2S$ breakthrough is at least 40 minutes, preferably at least 70 minutes, or even more preferably about 90 minutes. Other ranges are also possible.

Figure 2:
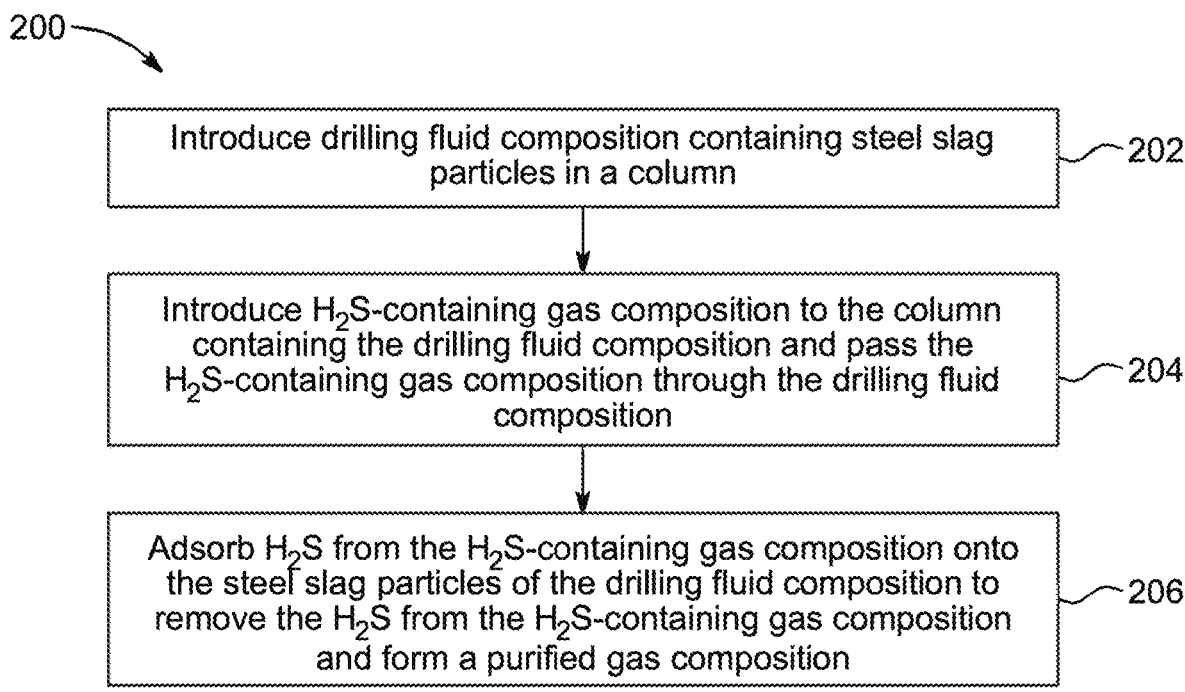
FIG. 2 shows a schematic flow diagram of a process for removing $H_2S$ from a $H_2S$-containing gas composition by the drilling fluid composition, according to certain embodiments.

Referring to FIG. 2, a schematic flow diagram of a process 200 for removing hydrogen sulfide ($H_2S$) from a $H_2S$-containing gas composition by the drilling fluid composition is illustrated, according to an embodiment. The order in which the process 200 is described is not intended to be construed as a limitation, and any number of the described process steps may be combined in any order to implement the process 200. Additionally, individual steps may be removed or skipped from the process 200 without departing from the spirit and scope of the present disclosure.

At step 202, the process preferably includes a static process that includes introducing and/or loading the drilling fluid composition including the steel slag particles in a column. In some embodiments, the introducing may be performed at a temperature in a range of 5 to 50° C., 10 to 45° C., preferably 15 to 40° C., further preferably 20 to 35° C., and more preferably 25 to 30° C. In some embodiments, the drilling fluid occupies at least 1/20, 1/10, 3/10, 1/2, 2/3, 4/5, or 9/10 of the column volume. In some embodiments, the drilling fluid occupies no more than 10/11, 9/10, 4/5, 2/3, 1/2, 3/10, or 1/10 of the column volume. Other ranges are also possible. In some embodiments, the column has a bottom portion, a body portion and a top portion. In some embodiments, the bottom portion of the column is in fluid communication with the $H_2S$-containing gas composition via an inlet. In some further embodiments, the top portion of the column is in fluid communication with a purified gas storage tank via an outlet.

At step 204, the process includes introducing the $H_2S$-containing gas composition to the column containing the drilling fluid composition and passing the $H_2S$-containing gas composition through the drilling fluid composition. In some embodiments, the $H_2S$ is present in the $H_2S$-containing gas composition at a concentration in a range of 50 to 200 parts per million by volume (ppmv) based on a total volume of the $H_2S$-containing gas composition, preferably 75 to 175 ppmv, preferably 100 to 150 ppmv, or even more preferably about 125 ppnv. In some further embodiments, the $H_2S$-containing gas composition is introduced to the column at a rate of 1 to 150 milliliters per minute (mL/min) per milligram of the steel slag particles dispersed in the drilling fluid composition, preferably 20 to 130 mL/min, preferably 40 to 110 mL/min, or even more preferably 70 to 90 mL/min. Other ranges are also possible. In one embodiment the column may be subject to a counter current flow of a liquid such as an aqueous alkaline or acidic solution. In this embodiment the volume of the $H_2S$-containing gas composition passing through the steel slag particles is at least 10 times, preferably at least 20 times, or even more preferably at least 20 times, the volume of the liquid passing through the steel slag particles in counter current flow.

At step 206, the process includes adsorbing the $H_2S$ from the $H_2S$-containing gas composition onto the steel slag particles of the drilling fluid composition to remove the $H_2S$ from the $H_2S$-containing gas composition and form a purified gas composition.

EXAMPLES

The following examples demonstrate the method 100 for reducing the hydrogen sulfide ($H_2S$) content of the $H_2S$-containing subterranean formation by using the drilling fluid composition, as described herein. The examples are provided solely for illustration and are not to be construed as limitations of the present disclosure, as many variations thereof are possible without departing from the spirit and scope of the present disclosure.

Example 1: Materials

Practical field mud recipe was used to prepare 350 cubic centimeters ($cm^3$) of water-based drilling fluid samples using fresh water as base fluid. Then, practical functional additives were added sequentially to maintain the viscosity, pH value, fluid loss, shale swelling, filter cake formation, and mud density. The fluids were prepared under ambient conditions using a high-speed Hamilton Beach mixer and resulted in 12.4 pounds-per-gallon (ppg) mud weight. The $H_2S$ scavenger was added at the end and mixed for 10 minutes. A commercialized $H_2S$ scavenger (i.e., SourScav®), supplied by drilling fluid services company, was used as a reference for the comparison with the proposed scavenger. The obtained SourScav® was an iron gluconate-based powder that was soluble in water and has a density of 0.7 $g/cm^3$, pH of 4.5, and average concentration of 60 vol. %. Table 1 shows the drilling fluid formulation stating the mixing sequence, quantities, mixing time, and functional role of each additive.

Table 1 shows the recipe of base and $H_2S$ scavenger-containing drilling fluids

| Component | Unit | Quantity | Mixing Duration (minutes) | Function |
|---|---|---|---|---|
| Water | $cm^3$ | 308 | — | Base fluid |
| Defoamer | $cm^3$ | 0.08 | 1 | Anti-foam agent |
| Xanthan gum | g | 1 | 20 | Viscosity controller |
| Starch | g | 6 | 15 | Fluid loss controller |
| PAC-R | g | 1.5 | 15 | Fluid loss controller |
| NaCl | g | 60 | 10 | shale stabilizer |
| Caustic soda | g | 0.5 | 1 | Alkalinity controller |
| $CaCO_3$ | g | 15 | 10 | Bridging material |
| Barite | g | 150 | 10 | Weighting agent |
| $H_2S$ scavenger | g | 1 | 10 | $H_2S$ scavenger |

The steel-industry waste was characterized to obtain the chemical composition and particles size distribution and appearance. The elemental chemical composition was recognized using the M4 Tornado X-ray fluorescence (XRF), which revealed that the used waste contained 43.3% zinc oxide (ZnO), 33.8% sodium oxide ($Na_2O$), 14.3% Chlorine (Cl), and 2.9% ferric oxide ($Fe_2O_3$). The Helos Sympatec particle size distribution analyzer (PSD) indicated an average particle size ($D_{50}$) of 11.77 µm, while FIG. 3 shows the scanning electron microscope (SEM) image depicting the irregular shape of steel-waste particles that differs in size with a normal distribution.

Example 2: Methods

The influence of adding steel-waste on $H_2S$ sorption capacity of a water-based mud (WBM) was investigated through the scavenging experiment at atmospheric pressure and room temperature. A sketch of the test setup is shown in FIG. 4. In the present work, 10 $cm^3$ from drilling fluid sample was placed in a column with the lower end of the column was connected to a cylinder containing the sour gas with an $H_2S$ concentration in the sour gas of ~100 parts per million (ppm) while the other end was connected to a MultiRAE gas detector. Flowmeter with flowrate controller were used at the gas inlet to control the gas flowrate. The $H_2S$ concentration in the outlet gas stream was continuously recorded until it reached the same concentration as in the inlet stream (~100 ppm), signaling the saturation condition.

The $H_2S$ saturation capacity, which represents the amount of $H_2S$ scavenged (in mg) for each volume of fluid sample till the saturation time, was calculated using the following equation [See: Murtaza, M., Alarifi, S. A., Abozuhairah, A., Mahmoud, M., Onaizi, S. A., Al-Ajmi, M., 2021. Optimum Selection of $H_2S$ Scavenger in Light-Weight and Heavy-Weight Water-Based Drilling Fluids. ACS Omega 6, 24919-24930, incorporated herein by reference in its entirety]:

$$\text{Saturation capacity (mg/l)} = \frac{Q \times \rho \times \int_0^{t_s} (C_{in} - C_{out}) dt}{V \times 10^6} \quad (1)$$

where, Q is the inlet gas flowrate ($cm^3$/min), ρ represents the $H_2S$ density (mg/$cm^3$), $t_S$ is the saturation time in minutes (when $H_2S$ concentration in the outlet gas stream reaches 100 ppm), V is the used volume of drilling fluid ($cm^3$), $C_{in}$ and $C_{out}$ are the $H_2S$ concentrations at the inlet and outlet gas streams (ppm), respectively. $C_{out}$ is time-dependent variable. The parameters and conditions that were adopted in scavenging experiments are listed in Table 2.

TABLE 2

| Parameters of $H_2S$ scavenging test | |
|---|---|
| Parameter | Value |
| Volume of fluid sample | 10 $cm^3$ |
| Gas flowrate | 150 $cm^3$/min |
| $H_2S$ density | 1.391 mg/$cm^3$ |
| $H_2S$ saturation concentration | 100 ppm |
| Minimum $H_2S$ detection limit | 0.1 ppm |
| Maximum $H_2S$ detection limit | 100 ppm |
| Pressure | Atmospheric |
| Temperature | ~25° C. |

The pH values of the prepared drilling fluid samples including the base and scavenger-containing fluids were measured at ambient conditions using a pH meter.

Since the mud's rheological features are important during drilling operations, the rheology measurements were conducted as per the American Petroleum Institute (API) standard procedures (API, 2019, incorporated herein by reference in its entirety) to evaluate these characteristics for the base, reference, and the waste-containing muds. These properties include plastic viscosity (PV), yield point (YP), and gelling strengths at 10 seconds and 10 minutes. The measurements were performed at 120 degrees Fahrenheit (° F.) using OFITE viscometer model 900. In these tests, the fluid sample was stirred at various rotation speeds (i.e., 3, 6, 100, 200, 300, and 600 revolutions per minute (rpm)) and recorded the shear stress at each speed. The values of PV (cP) and YP (lb/100 ft$^2$) were obtained from the shear stress-shear rate relationship by applying Bingham plastic model with the following equations:

$$PV = \Phi_{600\,rpm} - \Phi_{300\,rpm} \quad (2)$$

$$YP = \Phi_{300\,rpm} - PV \quad (3)$$

where, $\Phi_{600rpm}$ and $\Phi_{300rpm}$ are the shear stress dial readings (lb/100 ft$^2$) corresponding to 600 and 300 rpm rotation speeds.

The gel strength values were measured by momentarily stirring the fluid sample at a low shear rate (i.e., 3 rpm) after staying static for 10 seconds and 10 minutes. The high-temperature high-pressure (HTHP) filtration test was performed by adhering to the API standard procedures and using the HTHP filter press to address the filtration behavior. The test was conducted by placing the fluid sample in the filtration cell with a 40 µm ceramic disc at the cell bottom, then applying 300 pounds per square inch (psi) differential pressure and temperature of 250° F. for 30 minutes. The filtrate volume was collected in a graduated cylinder and recorded at different time intervals. Also, the composed filter-cake was evaluated by measuring its thickness and weight.

The corrosion rate for the proposed scavenger-containing fluid was evaluated and compared with the base and reference fluids. The HTHP corrosion test was conducted using metal coupons, from casing steel of N80 grade, soaked in the prepared drilling fluids for 6 hours at 250° F. and 300 psi inside an autoclave cell.

Example 3: H$_2$S Sorption Test

The results of scavenging test showed that H$_2$S started to breakthrough after 8 minutes and reached the saturation concentration after 85 minutes of the contact with the base mud, while the SourScav®-containing mud adsorbed H$_2$S till it started to breakthrough after 13 minutes and the concentration at the outlet increased up to the saturation at 120 minutes. Adding the steel-waste material increased the fluid's ability of H$_2$S scavenging since the breakthrough was delayed up to 31 minutes and reached the saturation after 149 minutes (shown in FIG. 5).

Figure 6:
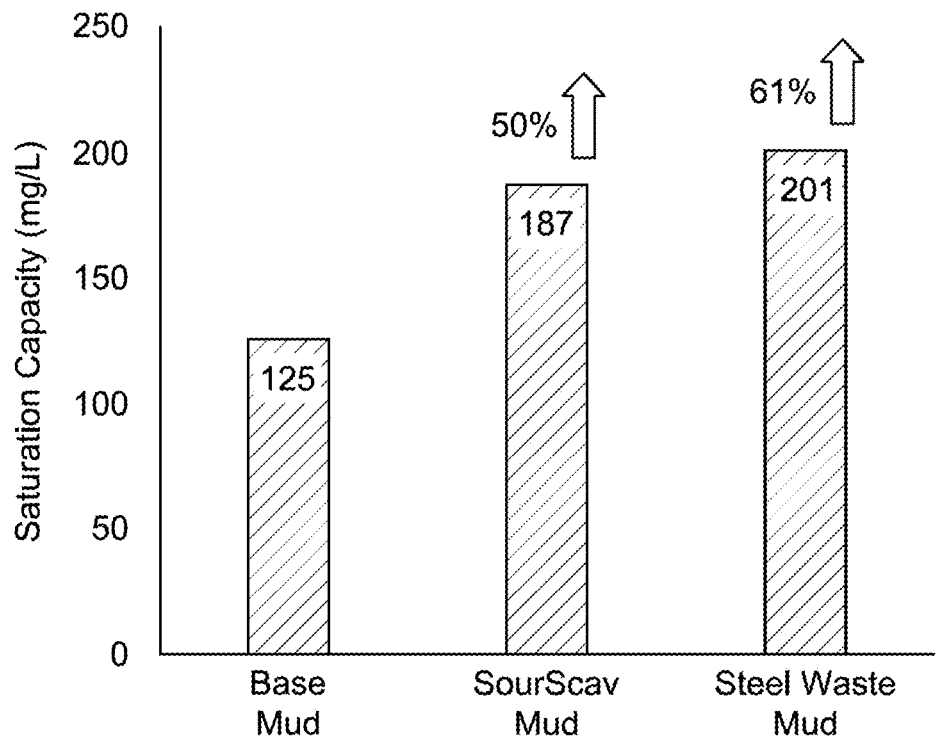
FIG. 6 is a graphical representation showing resulted saturation capacities in base mud, SourScav® mud and steel waste mud, according to certain embodiments.

The H$_2$S scavenging capacities at saturation, which were calculated using equation 1, indicated that the base mud had a capacity of 125 mg of adsorbed H$_2$S/L of the base mud, whereas the commercial SourScav® enhanced the saturation capacity by 50% amounting 187 mg/L. Furthermore, the steel-waste material improved the H$_2$S scavenging capacity of the drilling fluid by 61% reaching 201 mg/L (FIG. 6). The content of zinc and iron oxides in the steel-waste composition, as deduced from the XRF analysis, was mostly attributed to this outstanding scavenging capacity, as mentioned in the introduction section that both zinc and iron compounds are used as H$_2$S removals with approved efficiency.

Based on the obtained results, the steel-waste showed competent H$_2$S scavenging capability compared to the base mud and the commercial SourScav®. The influence of using the steel-waste on the water-based mud properties (i.e., rheology, filtration, corrosion rate, and alkalinity) has been also investigated and the results are presented and discussed in the subsequent sections.

Example 4: Rheology Tests

The rheology measurement indicated that the base mud had a PV value of 32.5 cP and YP of 95.9 lb/100 ft$^2$ with 10-seconds/10-minutes gel strengths of 6/7 lb/100 ft$^2$. Adding the SourScav® resulted in 21 and 24% reductions on plastic viscosity and yield point reaching 25.8 cP and 72.8 lb/100 ft$^2$, respectively. Also, the gel strengths dropped to 4/5 lb/100 ft$^2$. On the other hand, the steel-waste increased the PV to 37.7 cP and the YP to 104.4 lb/100 ft$^2$ and resulted in more robust gel structure with higher gel strength values of 7/8 lb/100 ft$^2$. The increment in rheological characteristics was justified by the steel-waste composition, which was similar to bentonite clay [See: Magzoub, M. I., Ibrahim, M. H., Nasser, M. S., El-Naas, M. H., Amani, M., 2020. Utilization of Steel-Making Dust in Drilling Fluids Formulations. Processes 8, 538, incoporated herein by reference in its entirety]. Additionally, the improved yield point and gel strengths induced by the incorporation of the steel-waste in the mud formulation would boost the mud capability of solids suspension, cuttings removal, and cuttings suspension during static and dynamic well conditions. The PV and YP values of the drilling fluid samples are presented in FIG. 7 while FIG. 8 shows their gel strength values.

Example 5: Filtration Test

The HTHP filtration test indicated that the steel-waste mud possesses more competent filtration performance relative to the base mud. FIG. 9A-9C showed the filtrated volume with steel-waste was dropped to 8.8 cm$^3$ from 11.8 cm$^3$ for the base mud, which is a 25% reduction. The characteristics of the steel-waste particles and mud rheology enhancement resulted in fast plugging mechanism and contributed to reduce the filtrated volume and solids invasion; hence, mitigated the formation damage. The characteristics of the composed filter cake (FIG. 9A-9C and FIGS. 10A-10C) showed slight reduction in weight and thickness by 7 and 3% from 22 g and 3 mm to 20.5 g and 2.9 mm, respectively. Decreasing the filter cake thickness might reduce the sticking potential and ease the removal process. This improvement led to the preferred composed filter cake which should be impermeable, thin, fast formulated, and easy to remove. The SourScav® reduced the filtrated volume by 24% and significantly enhanced the thickness and weight of the composed filter cake by 22 and 20%, respectively (FIG. 9A-9C and FIGS. 10A-10C).

Example 6: Corrosion test

Figure 11A:
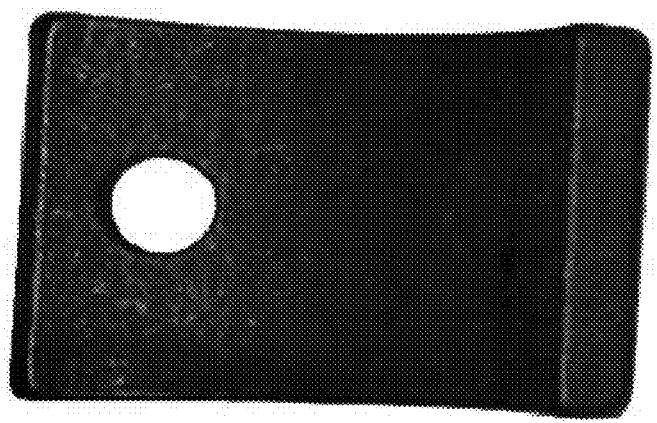
FIG. 11A shows a metal coupon after contacting with base mud, according to certain embodiments.
Figure 11B:
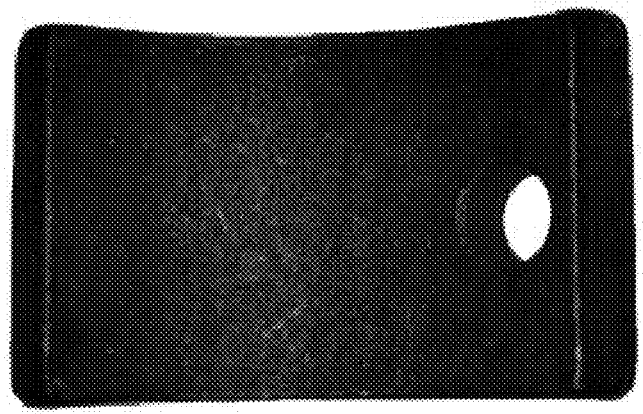
FIG. 11B shows a metal coupon after contacting with SourScav® mud, according to certain embodiments.
Figure 11C:
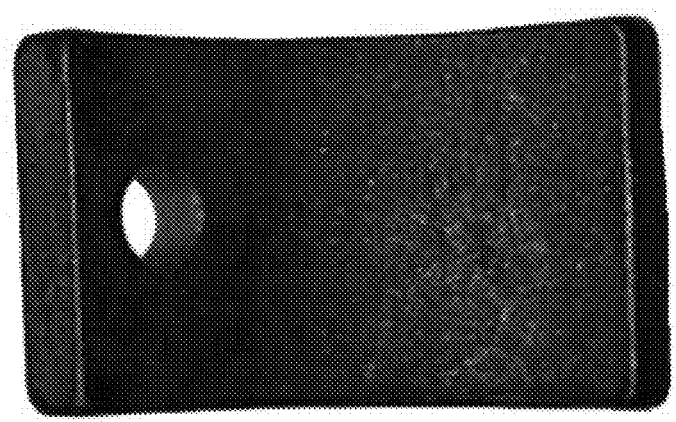
FIG. 11C shows a metal coupon after contacting with steel-waste mud, according to certain embodiments.

The corrosion tests on the metal coupons resulted in a corrosion rate of 0.9×10$^{-5}$ lb/ft$^2$ for the base fluid, while adding the SourScav® gave almost zero corrosion rate. The waste-containing fluid had 0.9×10$^{-5}$ lb/ft$^2$ corrosion rate. The corrosion rate on the metal coupons was preferred not to exceed 0.9×10$^{-5}$ lb/ft$^2$ after six hours of immersing the coupon in the mud sample, indicating the corrosion rate of the waste-containing fluid is acceptable. Additionally, the corrosion test results indicated that the inclusion of the steel-waste in the mud formulation did not result in exacerbating the corrosion rate. FIGS. 11A-11C depicted the status of the coupons after the corrosion tests.

Example 7: pH Measurement

The pH measurement showed that the pH values of the base, SourScav®, and steel-waste containing muds are 11.4, 9.1, and 11.1, respectively. The lower pH of SourScav® (i.e., 4.5) was attributed to this significant associated drop. Generally, the practical pH range of drilling muds is 9.0 to 11.0, however, elevating the pH is a recommended practice to limit the $H_2S$ effects and the regulations set pH level of 10 to be always maintained as a minimum in a sour environment [See: Carter, D. R., Adams, N. J., 1979. Hydrogen Sulfide In The Drilling Industry, in: SPE Deep Drilling and Production Symposium, Amarillo, Texas, April 1-3. SPE, incorporated herein by reference in its entirety]. Accordingly, the resulted pH from using the steel-waste complies with the regulations and recommendations.

From the economic point of view, drilling expenditures currently contribute 50-80% of exploration costs and 30-80% of field development costs. Also, the booming steel production generates significant amounts of waste, which has been estimated to be considerably 2-4 tons per ton of steel produced [See: Das, B., Prakash, S., Reddy, P. S. R., Misra, V. N., 2007. An overview of utilization of slag and sludge from steel industries. Resour. Conserv. Recycl. 50, 40-57; Magzoub, M. I., Ibrahim, M. H., Nasser, M. S., El-Naas, M. H., Amani, M., 2020. Utilization of Steel-Making Dust in Drilling Fluids Formulations. Processes 8, 538; Morone, M., Costa, G., Polettini, A., Pomi, R., Baciocchi, R., 2014. Valorization of steel slag by a combined carbonation and granulation treatment. Miner. Eng. 59, 82-90; and Yusuf, M., Chuah, L., Khan, M. A., Choong, T. S. Y., 2014. Adsorption of Nickel on Electric Arc Furnace Slag: Batch and Column Studies. Sep. Sci. Technol. 49, 388-397, each incorporated herein by reference in their entirety]. As a result, steel-industry waste is readily available and can be obtained as a raw material from a variety of steel plants.

The present disclosure showed that the steel-industry waste could be incorporated into water-based muds to effectively scavenge hydrogen sulfide. The innovative and low-cost $H_2S$ scavenger, which was generated from utilizing and recycling the steel industry waste, helps in waste management process and, thus, reduces the negative environmental and economic impacts of these wastes. Moreover, the presence of the steel-industry waste in the drilling mud improved the mud competency and properties.

In the present work, the steel-industry waste was used as $H_2S$ scavenger to enhance the sorption capacity of WBM. The scavenging capacity and effects on mud properties were investigated and compared with a commercial SourScav®.

According to the experimental results, utilizing steel-waste improved the base mud's $H_2S$ scavenging capability by 61%, compared to 50% with the SourScav® at the required pH for drilling applications in sour environments. Incorporating steel-waste also raised the plastic viscosity (PV) and yield point (YV) by 16% and 9%, respectively, and improved gelling structure with higher gel strengths. Furthermore, adding steel-waste reduced the filtrated volume by 25% with less potential formation damage and a slight reduction in composed filter cake thickness and weight, whereas the SourScav®-composed filter cake characteristics were preferred, with weight and thickness reductions of 20% and 22%, respectively. Steel-waste and SourScav® both had non-corrosive effects, with corrosion rates of less than $0.9 \times 10^{-5}$ pounds per square foot (lb/ft$^2$). By exploiting and recycling steel industry waste, the present disclosure delivers a low-cost $H_2S$ scavenger that aids in waste management and, thus, the decrease of negative environmental and economic repercussions of these wastes.

Numerous modifications and variations of the present disclosure are possible in light of the above teachings. It is therefore to be understood that within the scope of the appended claims, the invention may be practiced otherwise than as specifically described herein.

The invention claimed is:

1. A method for reducing a hydrogen sulfide ($H_2S$) content of a $H_2S$-containing subterranean formation, comprising:
    drilling the $H_2S$-containing subterranean formation to form a wellbore therein;
    injecting a drilling fluid composition into the wellbore during the drilling and circulating the drilling fluid composition in the wellbore; and
    recovering a product stream from the $H_2S$-containing subterranean formation,
    wherein the drilling fluid composition comprises:
        an aqueous base fluid;
        at least one additive selected from the group consisting of an anti-foaming agent, a fluid-loss additive, a viscosity modifier, a shale stabilizer, an alkali compound,
        a bridging agent, and a weighting agent;
            0.01 to 0.5 wt. % of steel slag particles, based on a total weight of the drilling fluid composition; and
            iron gluconate particles having an average particle size (D50) in a range of 10 to 60 µm;
        wherein the steel slag particles comprise 30 to 60 wt. % ZnO, 20 to 50 wt. % Na2O, 5 to 25 wt. % Cl, and 0.5 to 6 wt. % Fe2O3, each wt. % based on a total weight of the steel slag particles as determined by X-ray fluorescence (XRF); and
        wherein the steel slag particles have an irregular shape, and an average particle size (D50) in a range of 5 to 20 µm.

2. The method of claim 1, wherein the drilling fluid composition comprises 0.1 to 0.3 wt. % of the steel slag particles, based on the total weight of the drilling fluid composition, and wherein the steel slag particles have an average particle size (D50) of 11 to 13 µm.

3. The method of claim 1, wherein the drilling fluid composition has a $H_2S$ absorption capacity of up to 300 mg/L based on a total volume of the drilling fluid composition.

4. The method of claim 1, wherein the drilling fluid composition has a pH of 10 to 12.

5. The method of claim 1, wherein the drilling fluid composition has a plastic viscosity (PV) of 30 to 50 centipoise (cP).

6. The method of claim 1, wherein the drilling fluid composition has a yield point (YP) of 80 to 120 pounds per one hundred square feet (lb/100 ft$^2$).

7. The method of claim 1, wherein the drilling fluid composition has a gel strength value of 5 to 10 lb/100 ft$^2$.

8. The method of claim 1, wherein the drilling fluid composition has a filtrated volume of no more than 10 cubic centimeter (cm$^3$), as determined by American Petroleum Institute (API) standard procedures (API, 2019).

9. The method of claim 1, wherein the drilling fluid composition has a corrosion rate of less than $0.9 \times 10^{-5}$ pounds per square feet (lb/ft$^2$), as determined by American Petroleum Institute (API) standard procedures (API, 2019).

10. The method of claim 1, wherein the $H_2S$ is present in the $H_2S$-containing subterranean formation at a concentration in a range of 50 to 200 parts per million by volume (ppmv) based on a total volume of the $H_2S$-containing subterranean formation.

11. The method of claim 1, wherein the drilling fluid has a $H_2S$ breakthrough time of at least 40 minutes.

12. The method of claim 1, wherein the wellbore is at least one selected from the group consisting of a vertical wellbore, a deviated wellbore, a multilateral wellbore, and a horizontal wellbore.

13. The method of claim 1, wherein the subterranean formation comprises at least one selected from the group consisting of an oil shale formation, a tar sands formation, a coal formation, and a conventional hydrocarbon formation.

\* \* \* \* \*